(12) United States Patent
Liu et al.

(10) Patent No.: US 12,273,932 B2
(45) Date of Patent: *Apr. 8, 2025

(54) METHODS, DEVICES, AND SYSTEMS FOR CONFIGURING SIGNAL RESOURCE FOR PHYSICAL RANDOM ACCESS CHANNEL

(71) Applicant: ZTE Corporation, Shenzhen (CN)

(72) Inventors: Juan Liu, Shenzhen (CN); Li Tian, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,293

(22) Filed: Mar. 11, 2024

(65) Prior Publication Data
US 2024/0215079 A1    Jun. 27, 2024

Related U.S. Application Data

(63) Continuation of application No. 17/991,244, filed on Nov. 21, 2022, now Pat. No. 11,963,238, which is a continuation of application No. PCT/CN2020/135070, filed on Dec. 10, 2020.

(51) Int. Cl.
*H04W 74/0833* (2024.01)
*H04L 27/26* (2006.01)
*H04W 74/08* (2024.01)

(52) U.S. Cl.
CPC ... *H04W 74/0841* (2013.01); *H04L 27/26025* (2021.01); *H04W 74/0866* (2013.01)

(58) Field of Classification Search
CPC ............ H04L 27/26025; H04L 27/261; H04L 5/0044; H04L 5/0053; H04L 5/0094; H04W 74/0833; H04W 74/0841; H04W 74/0866
See application file for complete search history.

(56) References Cited

U.S. PATENT DOCUMENTS

| | | | |
|---|---|---|---|
| 11,324,053 B2 * | 5/2022 | Svedman | H04W 74/02 |
| 11,963,238 B2 * | 4/2024 | Liu | H04W 74/0866 |
| 2019/0357232 A1 | 11/2019 | Raghothaman et al. | |
| 2023/0199856 A1 * | 6/2023 | Guo | H04W 74/0833 370/329 |

FOREIGN PATENT DOCUMENTS

| | | |
|---|---|---|
| CN | 109698739 A | 4/2019 |
| WO | WO 2020033660 A1 | 2/2020 |

OTHER PUBLICATIONS

Canadian Examination Report regarding Application No. 3,162,090 dated May 1, 2024, 4 pages.
(Continued)

*Primary Examiner* — Kashif Siddiqui
(74) *Attorney, Agent, or Firm* — Crowell & Moring LLP

(57) ABSTRACT

The present disclosure describes methods, systems and devices for configuring signal resource for physical random access channel (PRACH). One method includes configuring, by a base station, signal resource for a PRACH by mapping, by the base station, a PRACH slot pattern with a pattern parameter. Another method includes configuring, by a user equipment, signal resource for a PRACH by mapping, by the user equipment, a PRACH slot pattern with a pattern parameter.

12 Claims, 14 Drawing Sheets

400 mapping, by the base station, a PRACH slot pattern with a pattern parameter
410

(56) References Cited

OTHER PUBLICATIONS

International Search Report and Written Opinion regarding PCT/CN2020/135070 dated Sep. 8 2021, 6 pages.
Extended European Search Report regarding EP 20 96 4607 dated Jul. 20, 2023, 9 pages.
Japanese Notice of Allowance with concise translation regarding 2022-542158 dated Sep. 8, 2023, 6 pages.
CMCC. "3GPP TSG RAN WGI Meeting #92 RI-1802032," *Discussion on PRACH configuration table*, Mar. 2, 2018, 16 pages.
ZTE et al. "3GPP TSG RAN WGI Meeting #90bis RI-1717035," *PRACHfc1rmats and Resource Configuration*, Oct. 13, 2017, 9 pages.
Nokia et al, "Required changes to NR using existing DL/UL NR waveform," 3GPP DRAFT; RI-2007926, 3rd Generation Partnership Project (3GPP), Mobile Competence Centre; 650, Route Des Lucioles, F-06921 Sophia-Antipolis Cedex, France, vol. RAN WGI, No. e-Meeting; Oct. 26, 2020-Nov. 13, 2020, Oct. 16, 2020, XP051939416, 41 pages. Retrieved from the Internet: https://ftp.3gpp.org/tsg_ran/WG1_RL1/TSGR1_103-e/Docs/RI-2007926.zip.
Huawei et al, "PHY design in 52.6-71 GHz using NR waveform," SGPP Draft; RI-2007604, 3rd Generation Partnership Project (SGPP), Mobile Competence Centre; 650, Route Des Lucioles; F-06921 Sophia-Antipolis Cedex, France, vol. RAN WGI, No. E-meeting; Oct. 26, 2020-Nov. 13, 2020, Oct. 17, 2020, XP051939809, 16 pages. Retrieved from the Internet: https://ftp.3gpp.org/tsg_ran/WG1_RL1/TSGR1_103-e/Docs/RI-2007604.zip.
Indonesian Office Action with Unofficial English Translation regarding Application No. P00202206688 dated Mar. 8, 2024, 7 pages.
Chinese Patent Office Office Action with English cover page translation and English translation and Search Report with English translation regarding application No. 202311680773.4 dated Dec. 9, 2024, 16 pages.
Intel Corporation, Remaining details of 3GPP TSG RAN WG1 #91, RL1, R1-1720061 dated Nov. 18, 2017, 11 pages.

\* cited by examiner

400 mapping, by the base station, a PRACH slot pattern with a pattern parameter
410

FIG. 4A

450 mapping, by the UE, a PRACH slot pattern with a pattern parameter
455

FIG. 4B

METHODS, DEVICES, AND SYSTEMS FOR CONFIGURING SIGNAL RESOURCE FOR PHYSICAL RANDOM ACCESS CHANNEL

CROSS-REFERENCE TO RELATED APPLICATIONS

This application is a continuation application of U.S. patent application Ser. No. 17/991,244, filed on Nov. 21, 2022, which is incorporated herein by reference in its entirety. U.S. patent application Ser. No. 17/991,244 is a continuation application of PCT Patent Application No. PCT/CN2020/135070, filed with the China National Intellectual Property Administration, PRC on Dec. 10, 2020, which is incorporated herein by reference in its entirety.

TECHNICAL FIELD

The present disclosure is directed generally to wireless communications. Particularly, the present disclosure relates to methods, devices, and systems for configuring signal resource for physical random access channel (PRACH).

BACKGROUND

Wireless communication technologies are moving the world toward an increasingly connected and networked society. High-speed and low-latency wireless communications rely on efficient network resource management and allocation between user equipment and wireless access network nodes (including but not limited to base stations). A new generation network is expected to provide high speed, low latency and ultra-reliable communication capabilities and fulfill the requirements from different industries and users.

For the 5th Generation mobile communication technology, a base station and/or a user equipment need to configure signal resource for a physical random access channel (PRACH). There are several issues/problems with the existing system for configuring signal resources for PRACH. For example, some of the issues/problems are associated with new subcarrier spacing (SCS) for a channel bandwidth being wider in high carrier frequency. Another of the issues/problems is what the configuration rules would be with the newly introduced PRACH SCS. Another of the issues/problems is how the base station and/or user equipment confirm the PRACH slot and number in response to a specific subcarrier spacing.

The present disclosure may address at least some of issues/problems associated with the existing system to improve the performance of the wireless communication.

SUMMARY

This document relates to methods, systems, and devices for wireless communication, and more specifically, for configuring signal resource for physical random access channel (PRACH).

In one embodiment, the present disclosure describes a method for wireless communication. The method includes configuring, by a base station, signal resource for a physical random access channel (PRACH) by mapping, by the base station, a PRACH slot pattern with a pattern parameter.

In another embodiment, the present disclosure describes a method for wireless communication. The method includes configuring, by a user equipment, signal resource for a physical random access channel (PRACH) by mapping, by the user equipment, a PRACH slot pattern with a pattern parameter.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4A shows a flow diagram of a method for wireless communication.

FIG. 4B shows a flow diagram of a method for wireless communication.

FIG. 7O shows a schematic diagram of an exemplary embodiment for wireless communication.

DETAILED DESCRIPTION

Figure 1:
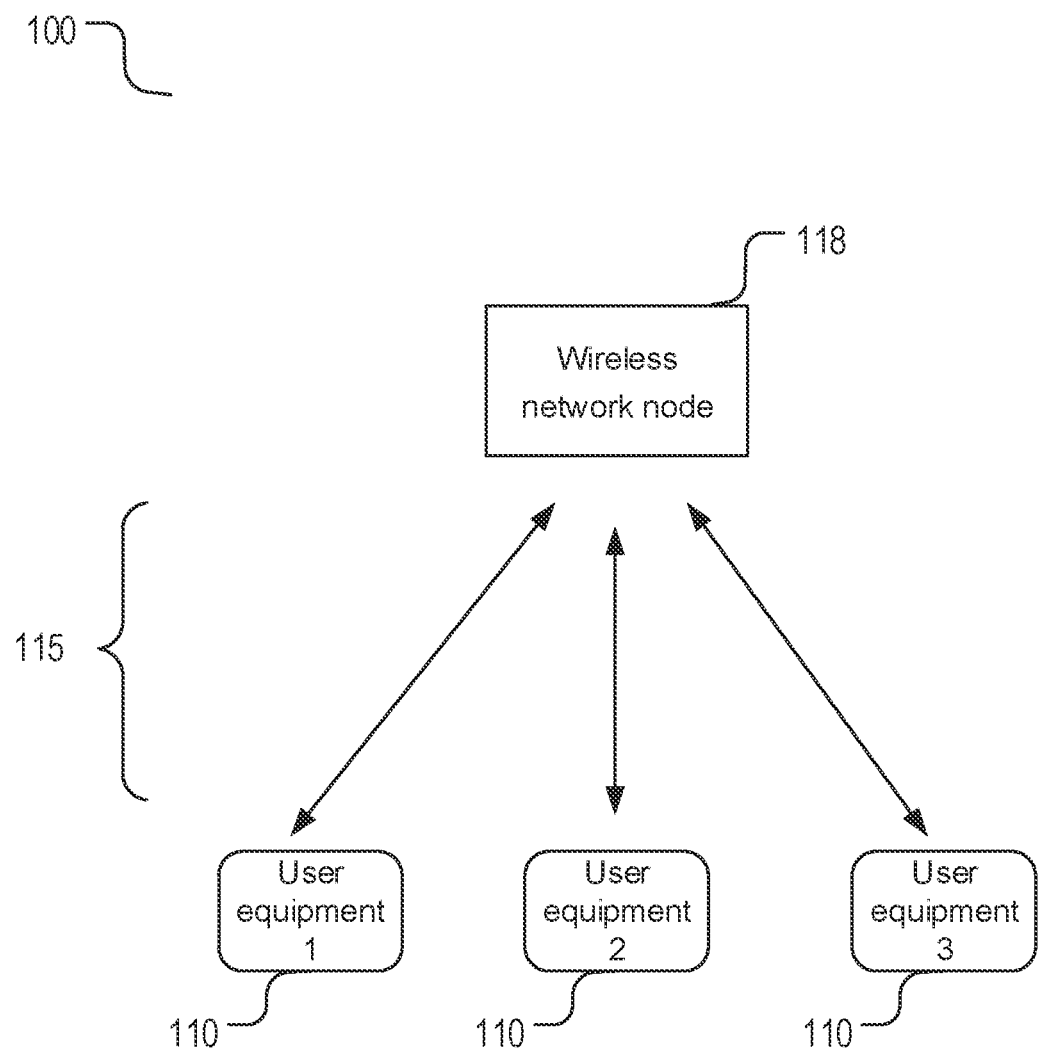
FIG. 1 shows an example of a wireless communication system include one wireless network node and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for configuring signal resource for a physical random access channel (PRACH).

New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfill the requirements from different industries and users.

The present disclosure describes various embodiments for transmitting initial access information to a user equipment. FIG. 1 shows a wireless communication system 100 including a wireless network node 118 and one or more user equipment (UE) 110. The wireless network node may include a network base station, which may be a nodeB (NB, e.g., a gNB) in a mobile telecommunications context. Each of the UE may wirelessly communicate with the wireless network node via one or more radio channels 115. For example, a first UE 110 may wirelessly communicate with a wireless network node 118 via a channel including a plurality of radio channels during a certain period of time. The network base station 118 may configure PRACH transmission parameters to the UE 110. The UE 110 may receive physical random access channel (PRACH) transmission parameters (for example but not limited to, PRACH preamble format, time resources, and frequency resources for PRACH transmission).

For the 5th Generation mobile communication technology, a base station and/or a user equipment need to configure signal resource for a physical random access channel (PRACH). There are several issues/problems with the existing system for configuring signal resources for PRACH. For example, some of the issues/problems are associated with new subcarrier spacing (SCS) for a channel bandwidth being wider in high carrier frequency. Another of the issues/problems is what the configuration rules would be with the newly introduced PRACH SCS. Another of the issues/problems is how the base station and/or user equipment confirm the PRACH slot and number in response to a specific subcarrier spacing. The present disclosure may address at least some of issues/problems associated with the existing system to improve the performance of the wireless communication.

In various embodiments, a parameter may be used to insure that the UE and/or base station confirm the slot in PRACH SCS, for example the PRACH SCS being 60 kHz. The parameter may be refereed as one of the following items: 'Number of PRACH slots within a subframe', 'Number of PRACH slots within a 60 kHz slot', or $n_{slot}^{RA}$. In one implementation, when the subcarrier spacing or the subcarrier spacing for random-access preambles is one of 1.25 kHz, 5 kHz, 15 kHz, or 60 kHz, the $n_{slot}^{RA}$ may be 0, which may indicate a first position for the PRACH slot.

In various embodiments, a parameter may be used to insure that the UE and/or base station confirm the slot in PRACH SCS, for example the PRACH SCS being 120 kHz. The parameter may be refereed as one of the following items: 'Number of PRACH slots within a subframe', 'Number of PRACH slots within a 60 kHz slot', or $n_{slot}^{RA}$. In one implementation, when the subcarrier spacing or the subcarrier spacing for random-access preambles is one of 30 kHz, or 120 kHz, the $n_{slot}^{RA}$ may be 1, which may indicate a second position for the PRACH slot.

In various embodiments, one or more new PRACH subcarrier spacing maybe introduced, a parameter may be used to insure that the UE and/or base station confirm the slot in the newly introduced PRACH SCS. For example, the parameter may be a pattern parameter for a RRACH slot pattern or $n_{slot}^{RA}$., which is used to map the PRACH slot pattern for configuring the signal resources for the PRACH. In one implementation, the carrier frequency in the various embodiment may be any part or all of the frequency range of a first frequency range (FR1) and/or a second frequency range (FR2). In another implementation, the carrier frequency in the various embodiment may be a third frequency range (FR3), for example but not limited, a higher frequency band above FR2, e.g., 52.6 GHz~71 GHz.

Figure 2:
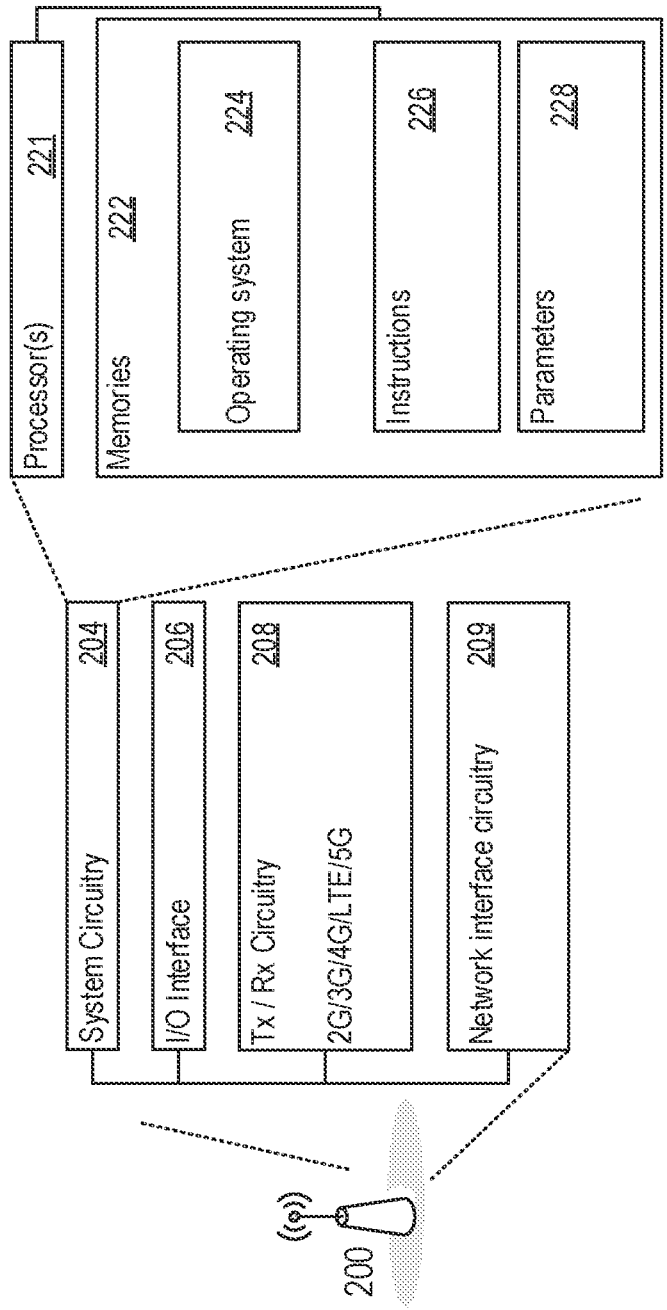
FIG. 2 shows an example of a network node.

FIG. 2 shows an example of electronic device 200 to implement a network base station. The example electronic device 200 may include radio transmitting/receiving (Tx/Rx) circuitry 208 to transmit/receive communication with UEs and/or other base stations. The electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 221 to perform the functions of the network node. The parameters 228 may include parameters to support execution of the instructions 226. For example, parameters may include network protocol settings, bandwidth parameters, radio frequency mapping assignments, and/or other parameters.

Figure 3:
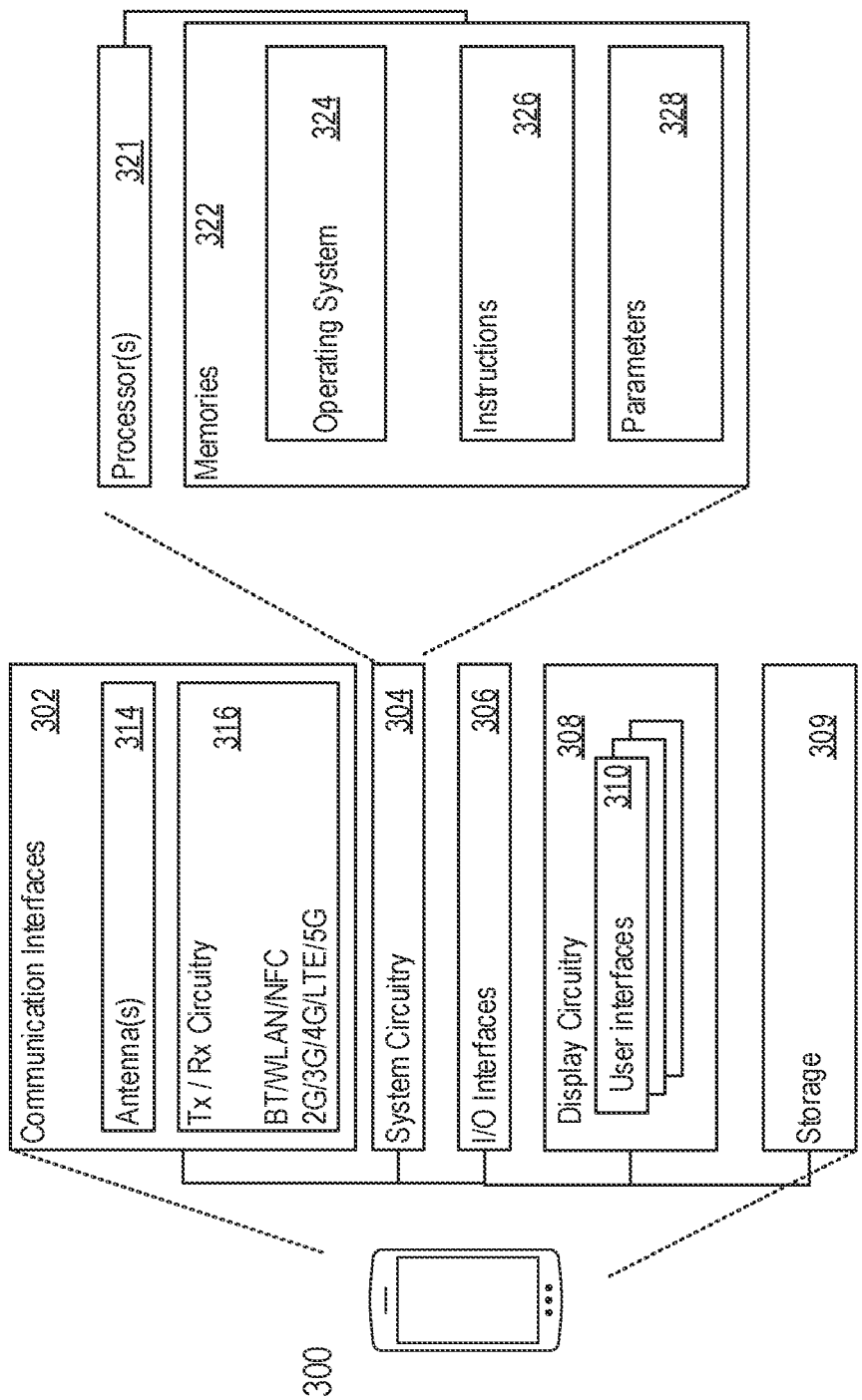
FIG. 3 shows an example of a user equipment.

FIG. 3 shows an example of an electronic device to implement a terminal device 300 (for example, user equipment (UE)). The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several below embodiments, which may be implemented, partly or totally, on the network base station and/or the user equipment described above in FIGS. 2-3.

Referring to FIG. 4A, the present disclosure describes embodiments of a method 400 for configuring, by a base station, signal resource for a physical random access channel (PRACH). The method 400 may include step 410: mapping, by the base station, a PRACH slot pattern with a pattern parameter. Referring to FIG. 4B, the present disclosure describes embodiments of a method 450 for configuring, by a user equipment (UE), signal resource for a physical random access channel (PRACH). The method 450 may include step 455: mapping, by the UE, a PRACH slot pattern with a pattern parameter.

The PRACH slot pattern with the pattern parameter may be based on at least one of following items: a PRACH subcarrier spacing (SCS), a specific time duration, or a maximum number of PRACH slots in the specific time duration. In one implementation, the PRACH slot pattern with the pattern parameter may be based on any one of items as follows: a PRACH subcarrier spacing (SCS), a specific time duration, or a maximum number of PRACH slots in the specific time duration. In another implementation, the PRACH slot pattern with the pattern parameter may be based on any two of following items: a PRACH subcarrier spacing (SCS), a specific time duration, or a maximum number of PRACH slots in the specific time duration. In another implementation, the PRACH slot pattern with the pattern parameter may be based on all of following items: a PRACH subcarrier spacing (SCS), a specific time duration, or a maximum number of PRACH slots in the specific time duration.

In various embodiments, the PRACH SCS may be referred as M Hz; the specific time duration (or special time duration) may be referred as N microsecond; and/or the max number PRACH slots in the specific time duration may be referred as Z. The PRACH slots in the specific time duration may be numbered in increasing order from 0 to Z−1. The pattern of the PRACH slots mapping in the specific time duration may be indicated or configured with a pattern parameter. In one implementation, the pattern parameter may be referred as $n_{slot}^{RA}$. The pattern parameter includes at least one value corresponding to the at least one PRACH slot, and the at least one value is an integer lower than Z. In another implementation, there are at least Q positions of the PRACH slots in the specific time duration, wherein $1 \leq Q \leq Z$.

In one implementation, the PRACH slot pattern with the pattern parameter may be given in the parameter configuration table of the physical layer, or given through high-layer signaling. In another implementation, the pattern parameter may be configured by at least one of the following: a parameter configuration table of a physical layer; or a high-layer signaling.

In various embodiments, the pattern parameter may be independent of other parameters.

In various embodiments, the PRACH SCS comprises at least one of the following: 15 kHz, 30 kHz, 60 kHz, 120 kHz, 240 kHz, 480 kHz, 960 kHz, or 1920*N kHz, wherein N is a positive integer.

In various embodiments, the specific time duration may be indicated by one of the following implementations. In one implementation, the specific time duration may comprise at least one of the following: 1000 microsecond, 500 microsecond, 250 microsecond, 125 microsecond, 62.5 microsecond, or 31.25 microsecond. In another implementation, the specific time duration comprises a slot duration of a single slot for a SCS being at least one of the following: 15 kHz, 30 kHz, 60 kHz, 120 kHz, 240 kHz, 480 kHz, 960 kHz, or 1920*N kHz, wherein N is a positive integer. In another implementation, the maximum number of PRACH slots in the specific time duration is Z, wherein Z is a positive integer; and the specific time duration is 1000/Z microsecond.

In various embodiments, the pattern of the PRACH slots mapping in the specific time duration may be indicated or configured with a pattern parameter, which may be referred as $n_{slot}^{RA}$. The pattern parameter may include a single number or a combination of K numbers, wherein $1 \leq K \leq Z$ and Z is the maximum number of PRACH slots in the specific time duration.

In various embodiments, the meaning of the one or more number in the pattern parameter may refer to the following:
'0' refers to the first position in the specific time duration;
'1' refers to the second position in the specific time duration;
'2' refers to the third position in the specific time duration;
'3' refers to the third position in the specific time duration;
'4' refers to the fifth position in the specific time duration;
'5' refers to the sixth position in the specific time duration;
'6' refers to the seventh position in the specific time duration;
'7' refers to the eighth position in the specific time duration;
'8' refers to the ninth position in the specific time duration;
'9' refers to the tenth position in the specific time duration;
'10' refers to the eleventh position in the specific time duration;
'11' refers to the twelfth position in the specific time duration;
'12' refers to the thirteenth position in the specific time duration;
'13' refers to the fourteenth position in the specific time duration;
'14' refers to the fifteenth position in the specific time duration;
'15' refers to the sixteenth position in the specific time duration;
'16' refers to the seventeenth position in the specific time duration;
'17' refers to the eighteenth position in the specific time duration;
'18' refers to the nineteenth position in the specific time duration;
'19' refers to the twentieth position in the specific time duration;
'20' refers to the twenty-first position in the specific time duration;
'21' refers to the twenty-second position in the specific time duration;
'22' refers to the twenty-third position in the specific time duration;
'23' refers to the twenty-fourth position in the specific time duration;
'24' refers to the twenty-fifth position in the specific time duration;
'25' refers to the twenty-sixth position in the specific time duration;
'26' refers to the twenty-seventh position in the specific time duration;
'27' refers to the twenty-eighth position in the specific time duration;
'28' refers to the twenty-ninth position in the specific time duration;
'29' refers to the thirtieth position in the specific time duration;
'30' refers to the thirty-first position in the specific time duration;
'31' refers to the thirty-second position in the specific time duration;
'32' refers to the thirty-third position in the specific time duration;
'33' refers to the thirty-fourth position in the specific time duration;
'34' refers to the thirty-fifth position in the specific time duration;
'35' refers to the thirty-sixth position in the specific time duration;
'36' refers to the thirty-seventh position in the specific time duration;
'37' refers to the thirty-eighth position in the specific time duration;
'38' refers to the thirty-ninth position in the specific time duration;
'39' refers to the fortieth position in the specific time duration;
'40' refers to the forty-first position in the specific time duration;
'41' refers to the forty-second position in the specific time duration;
'42' refers to the forty-third position in the specific time duration;
'43' refers to the forty-fourth position in the specific time duration;
'44' refers to the forty-fifth position in the specific time duration;

'45' refers to the forty-sixth position in the specific time duration;
'46' refers to the forty-seventh position in the specific time duration;
'47' refers to the forty-eighth position in the specific time duration;
'48' refers to the forty-ninth position in the specific time duration;
'49' refers to the fiftieth position in the specific time duration;
'50' refers to the fifty-first position in the specific time duration;
'51' refers to the fifty-second position in the specific time duration;
'52' refers to the fifty-third position in the specific time duration;
'53' refers to the fifty-fourth position in the specific time duration;
'54' refers to the fifty-fifth position in the specific time duration;
'55' refers to the fifty-sixth position in the specific time duration;
'56' refers to the fifty-seventh position in the specific time duration;
'57' refers to the fifty-eighth position in the specific time duration;
'58' refers to the fifty-ninth position in the specific time duration;
'59' refers to the sixtieth position in the specific time duration;
'60' refers to the sixty-first position in the specific time duration;
'61' refers to the sixty-second position in the specific time duration;
'62' refers to the sixty-third position in the specific time duration; and
'63' refers to the sixty-fourth position in the specific time duration.

Figure 5:
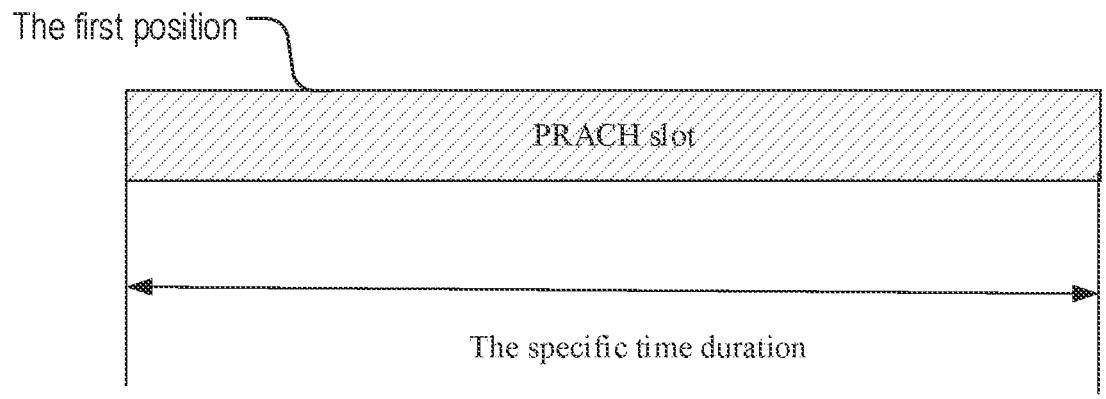
FIG. 5 shows a schematic diagram of an exemplary embodiment for wireless communication.

In one embodiment of the present disclosure, a maximum number of PRACH slots in the specific time duration may be 1. FIG. 5 shows a PRACH slot pattern including one slot and the pattern parameter comprises $\{0\}$, or $n_{slot}^{RA}=\{0\}$.

Figure 6A:
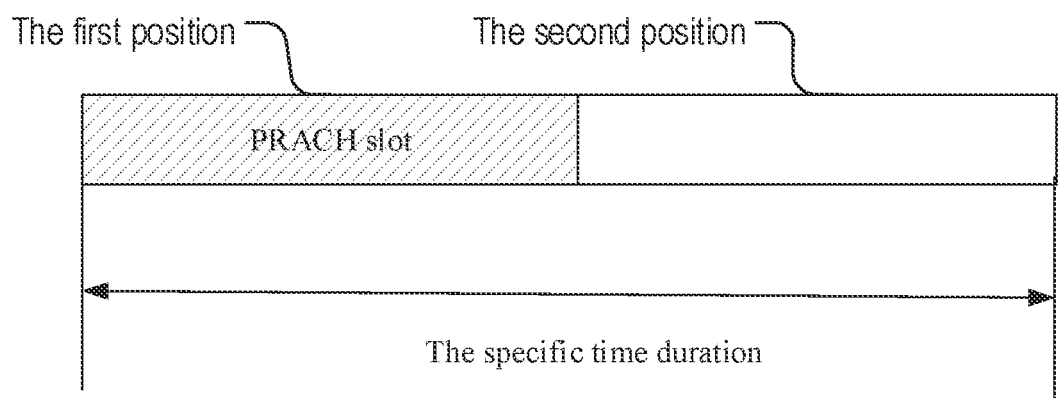
FIG. 6A shows a schematic diagram of an exemplary embodiment for wireless communication.
Figure 6B:
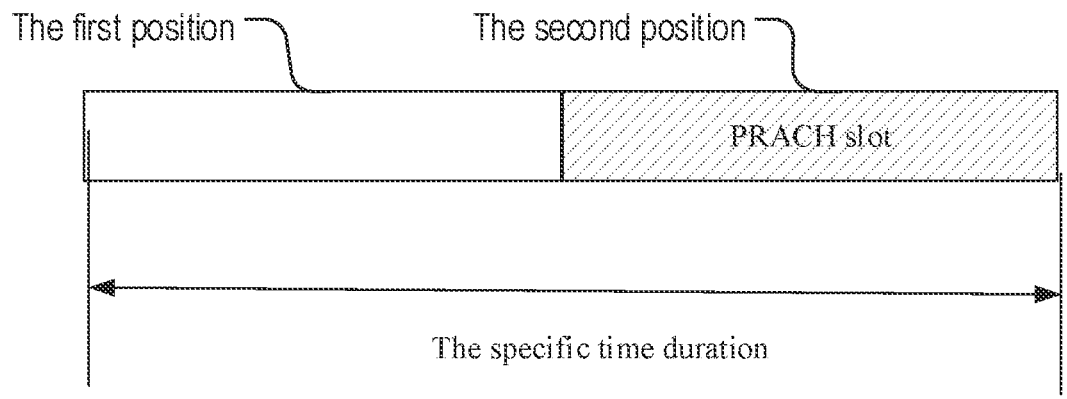
FIG. 6B shows a schematic diagram of an exemplary embodiment for wireless communication.
Figure 6C:
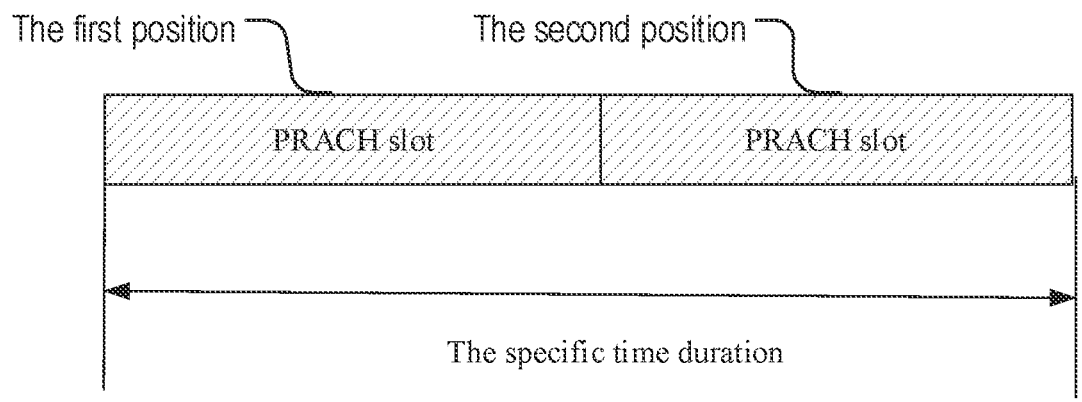
FIG. 6C shows a schematic diagram of an exemplary embodiment for wireless communication.

In another embodiment of the present disclosure, a maximum number of PRACH slots in the specific time duration may be 2. FIG. 6A shows a PRACH slot pattern including one slot with mapping to the first position in the specific time duration, wherein the pattern parameter comprises $\{0\}$, or $n_{slot}^{RA}=\{0\}$. FIG. 6B shows a PRACH slot pattern including one slot with mapping to the second position in the specific time duration, wherein the pattern parameter comprises $\{1\}$, or $n_{slot}^{RA}=\{1\}$. FIG. 6C shows a PRACH slot pattern including two slots with mapping to the first position and the second position in the specific time duration, wherein the pattern parameter comprises $\{0, 1\}$, or $n_{slot}^{RA}\{0, 1\}$.

Figure 7A:
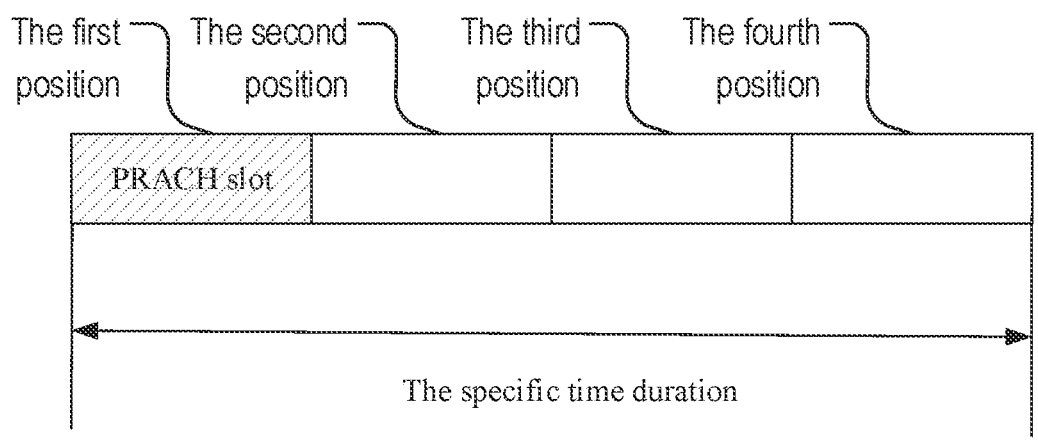
FIG. 7A shows a schematic diagram of an exemplary embodiment for wireless communication.
Figure 7B:
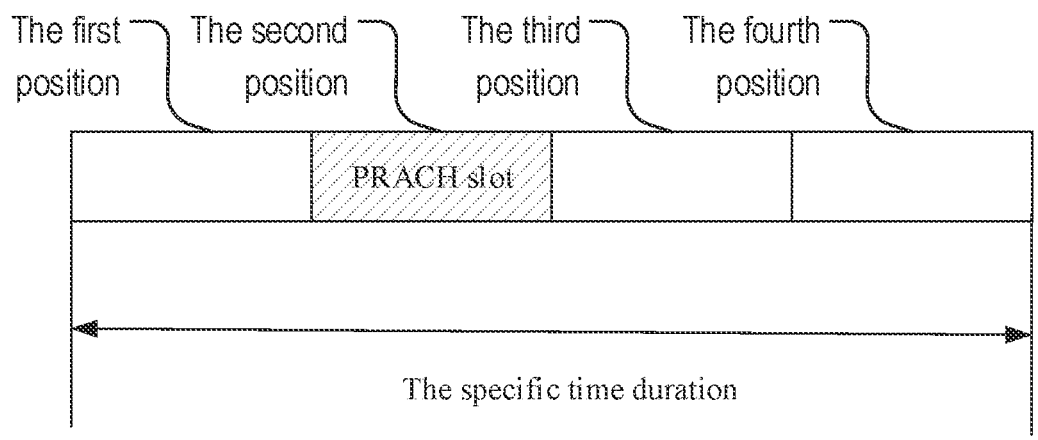
FIG. 7B shows a schematic diagram of an exemplary embodiment for wireless communication.
Figure 7C:
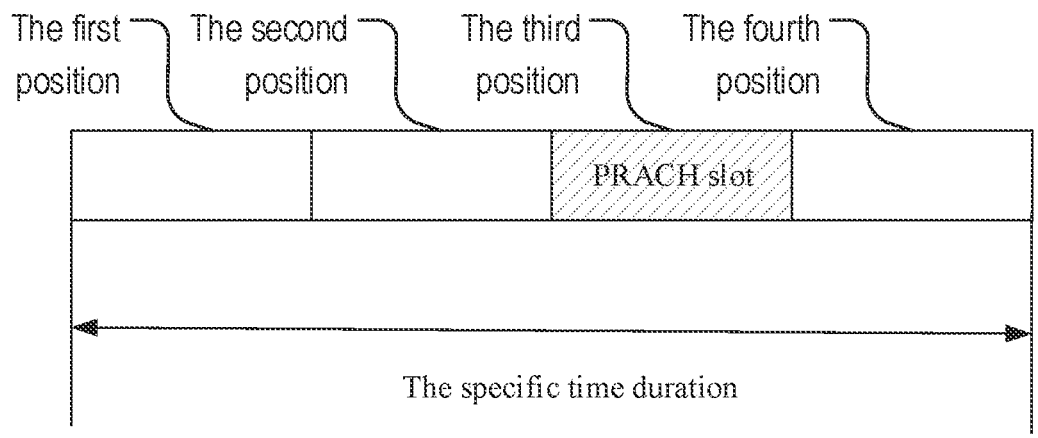
FIG. 7C shows a schematic diagram of an exemplary embodiment for wireless communication.
Figure 7D:
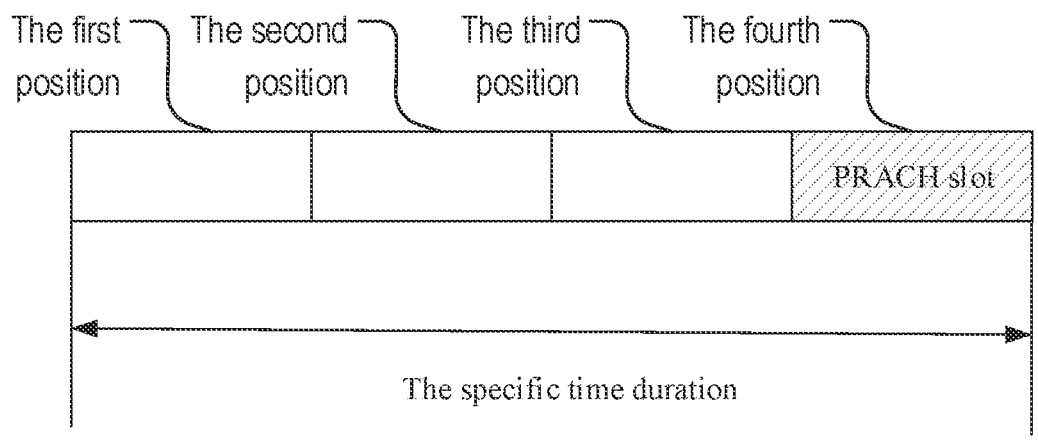
FIG. 7D shows a schematic diagram of an exemplary embodiment for wireless communication.

In another embodiment of the present disclosure, a maximum number of PRACH slots in the specific time duration may be 4. FIG. 7A shows a PRACH slot pattern including one slot with mapping to the first position in the specific time duration, wherein the pattern parameter comprises $\{0\}$, or $n_{slot}^{RA}=\{0\}$. FIG. 7B shows a PRACH slot pattern including one slot with mapping to the second position in the specific time duration, wherein the pattern parameter comprises $\{1\}$, or $n_{slot}^{RA}=\{1\}$. FIG. 7C shows a PRACH slot pattern including one slot with mapping to the third position in the specific time duration, wherein the pattern parameter comprises $\{2\}$, or $n_{slot}^{RA}=\{2\}$. FIG. 7D shows a PRACH slot pattern including one slot with mapping to the fourth position in the specific time duration, wherein the pattern parameter comprises $\{3\}$, or $n_{slot}^{RA}=\{3\}$.

Figure 7E:
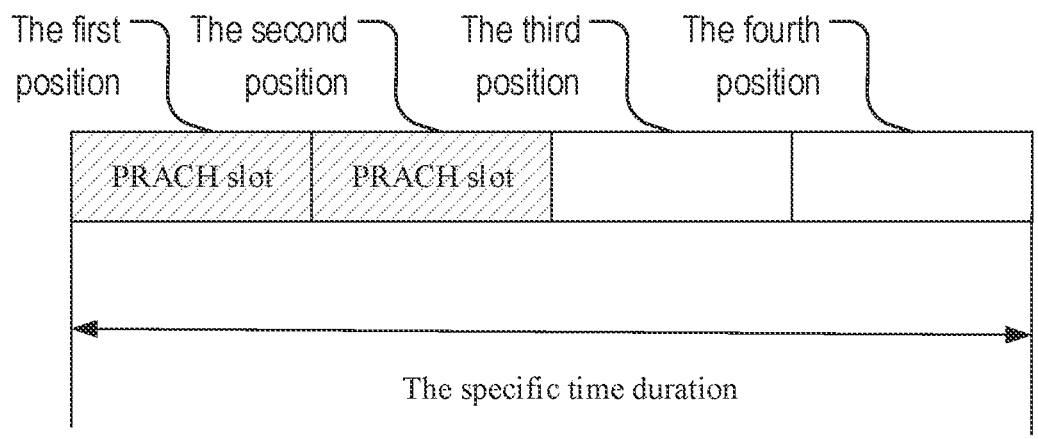
FIG. 7E shows a schematic diagram of an exemplary embodiment for wireless communication.
Figure 7F:
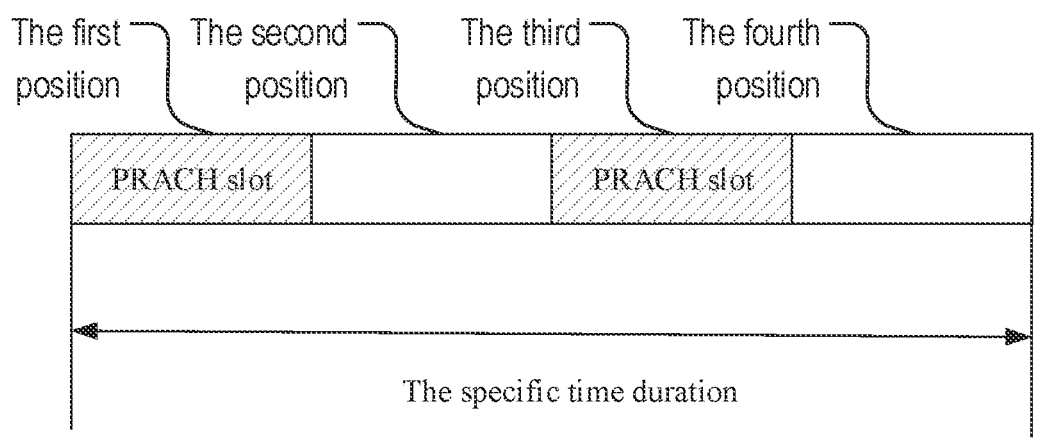
FIG. 7F shows a schematic diagram of an exemplary embodiment for wireless communication.
Figure 7G:
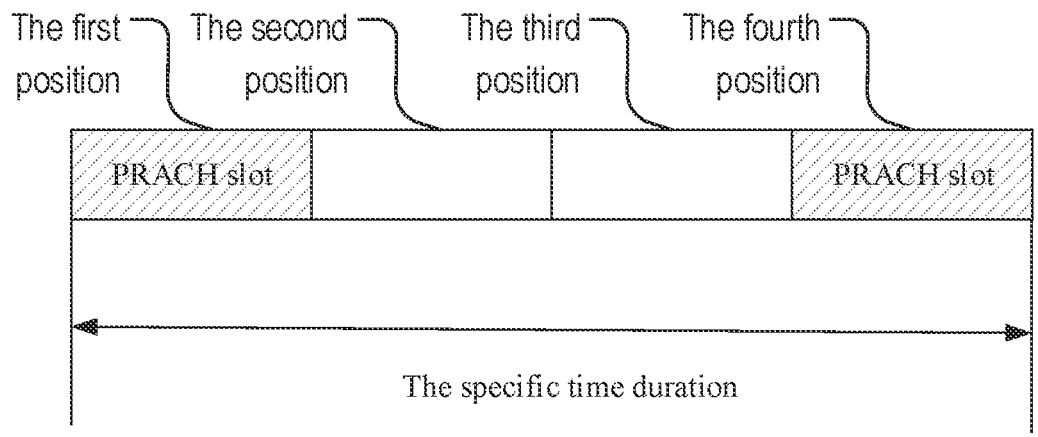
FIG. 7G shows a schematic diagram of an exemplary embodiment for wireless communication.
Figure 7H:
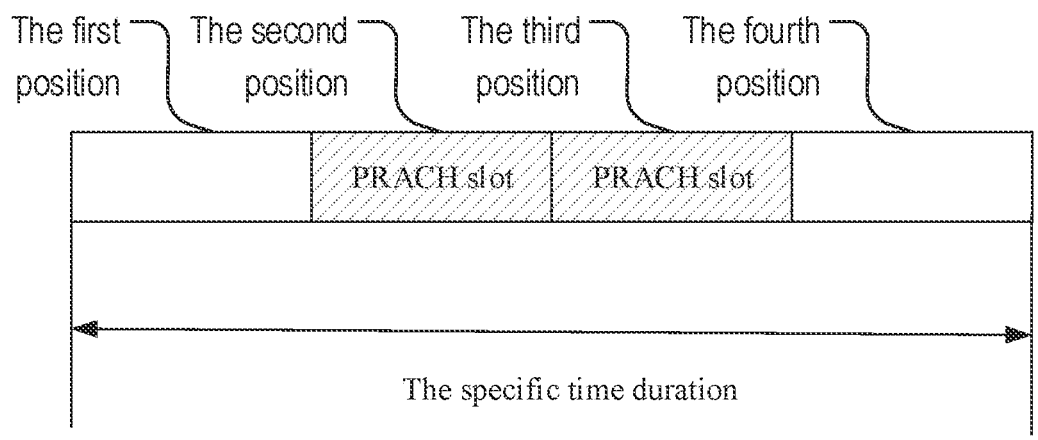
FIG. 7H shows a schematic diagram of an exemplary embodiment for wireless communication.
Figure 7I:
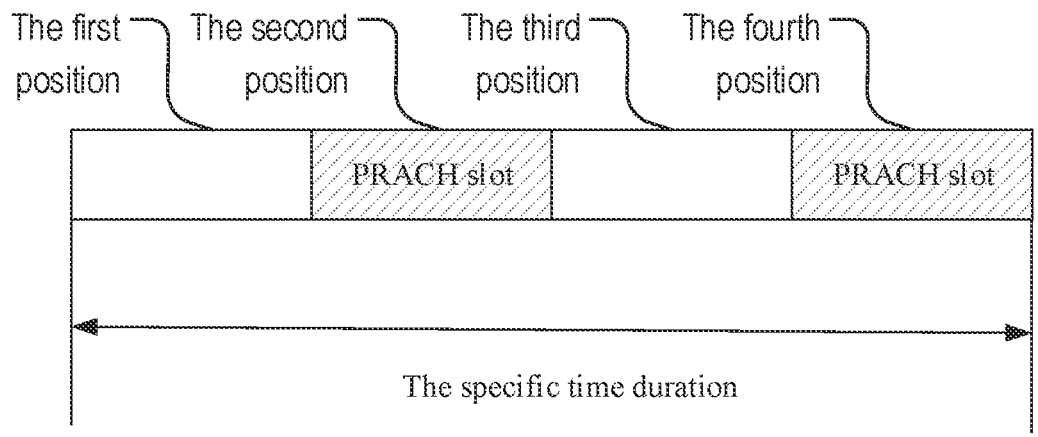
FIG. 7I shows a schematic diagram of an exemplary embodiment for wireless communication.
Figure 7J:
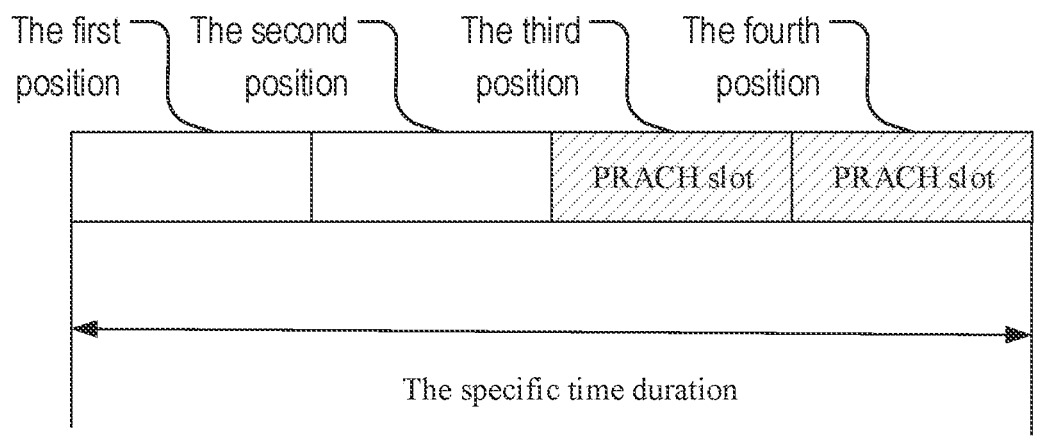
FIG. 7J shows a schematic diagram of an exemplary embodiment for wireless communication.

FIG. 7E shows a PRACH slot pattern including two slots with mapping to the first position and the second position in the specific time duration, wherein the pattern parameter comprises $\{0, 1\}$, or $n_{slot}^{RA}=\{0, 1\}$. FIG. 7F shows a PRACH slot pattern including two slots with mapping to the first position and the third position in the specific time duration, wherein the pattern parameter comprises $\{0, 2\}$, or $n_{slot}^{RA}=\{0, 2\}$. FIG. 7G shows a PRACH slot pattern including two slots with mapping to the first position and the fourth position in the specific time duration, wherein the pattern parameter comprises $\{0, 3\}$, or $n_{slot}^{RA}=\{0, 3\}$. FIG. 7H shows a PRACH slot pattern including two slots with mapping to the second position and the third position in the specific time duration, wherein the pattern parameter comprises $\{1, 2\}$, or $n_{slot}^{RA}=\{1, 2\}$. FIG. 7I shows a PRACH slot pattern including two slots with mapping to the second position and the fourth position in the specific time duration, wherein the pattern parameter comprises $\{1, 3\}$, or $n_{slot}^{RA}=\{1, 3\}$. FIG. 7J shows a PRACH slot pattern including two slots with mapping to the third position and the fourth position in the specific time duration, wherein the pattern parameter comprises $\{2, 3\}$, or $n_{slot}^{RA}=\{2, 3\}$.

Figure 7K:
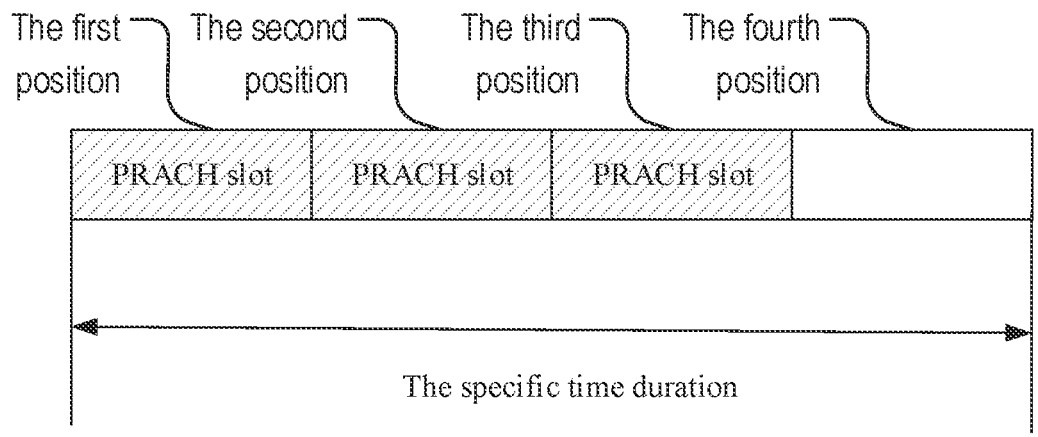
FIG. 7K shows a schematic diagram of an exemplary embodiment for wireless communication.
Figure 7L:
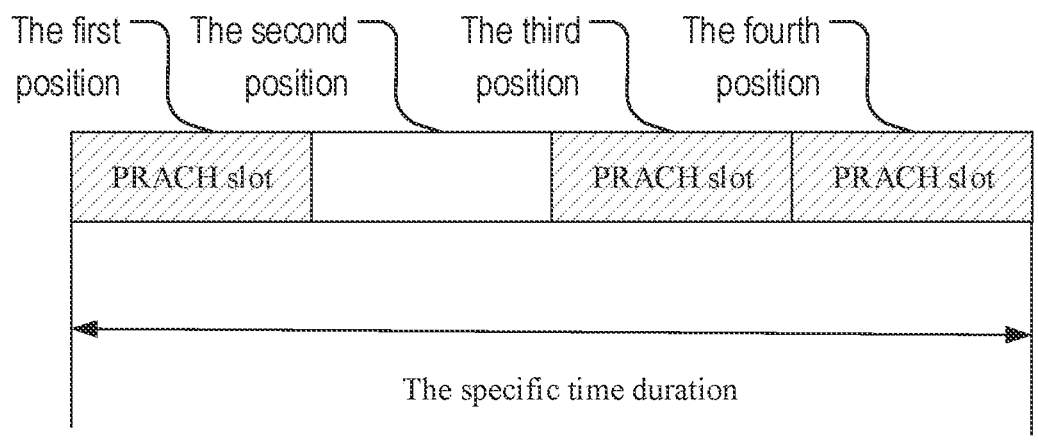
FIG. 7L shows a schematic diagram of an exemplary embodiment for wireless communication.
Figure 7M:
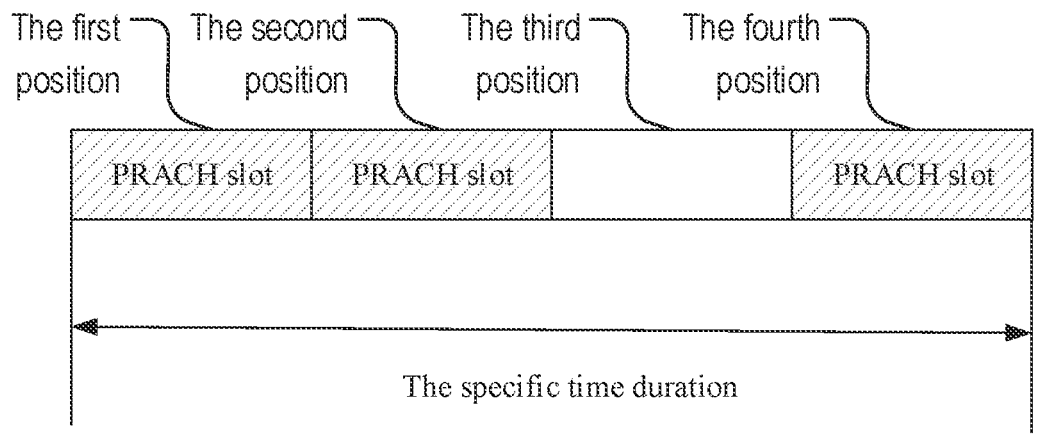
FIG. 7M shows a schematic diagram of an exemplary embodiment for wireless communication.
Figure 7N:
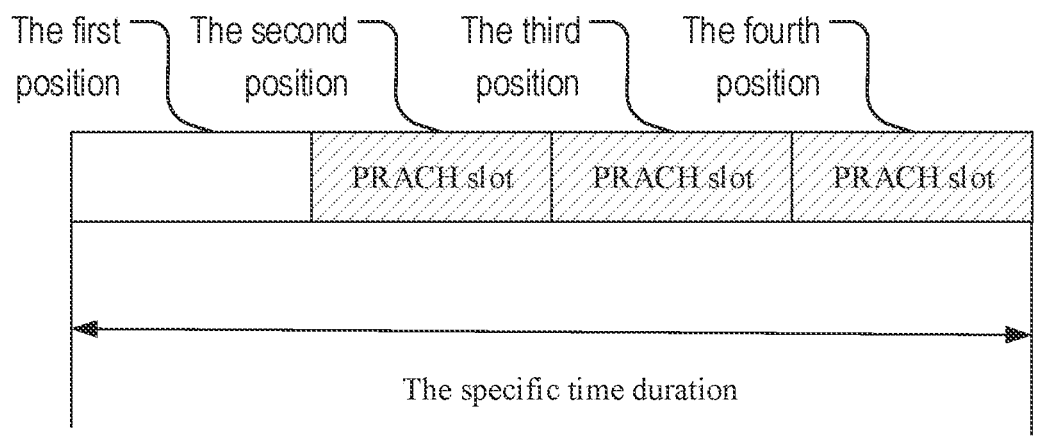
FIG. 7N shows a schematic diagram of an exemplary embodiment for wireless communication.
Figure 70:
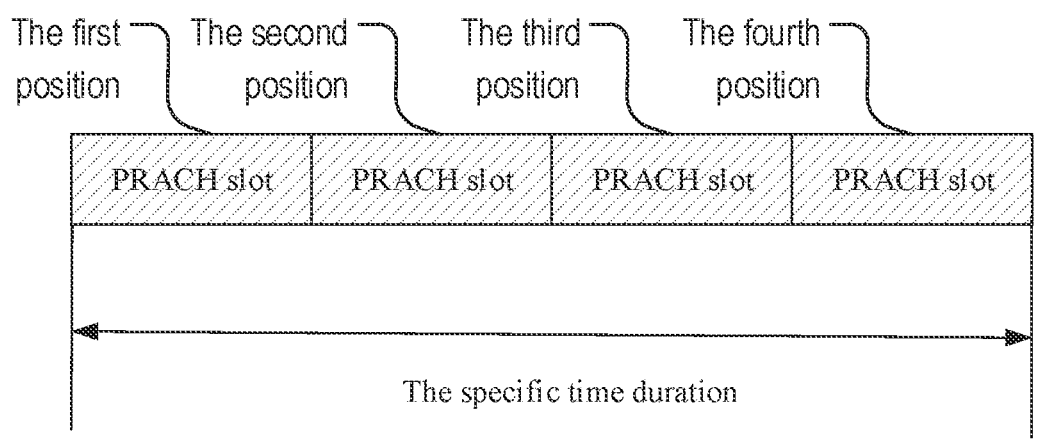

FIG. 7K shows a PRACH slot pattern including three slots with mapping to the first position, the second position, and the third position in the specific time duration, wherein the pattern parameter comprises $\{0, 1, 2\}$, or $n_{slot}^{RA}=\{0, 1, 2\}$. FIG. 7L shows a PRACH slot pattern including three slots with mapping to the first position, the third position, and the fourth position in the specific time duration, wherein the pattern parameter comprises $\{0, 2, 3\}$, or $n_{slot}^{RA}=\{0, 2, 3\}$. FIG. 7M shows a PRACH slot pattern including three slots with mapping to the first position, the second position, and the fourth position in the specific time duration, wherein the pattern parameter comprises $\{0, 1, 3\}$, or $n_{slot}^{RA}=\{0, 1, 3\}$. FIG. 7N shows a PRACH slot pattern including three slots with mapping to the second position, the third position, and the fourth position in the specific time duration, wherein the pattern parameter comprises $\{1, 2, 3\}$, or $n_{slot}^{RA}=\{1, 2, 3\}$.

FIG. 7O shows a PRACH slot pattern including four slots with mapping to the first position, the second position, the third position, and the fourth position in the specific time duration, wherein the pattern parameter comprises $\{0, 1, 2, 3\}$, or $n_{slot}^{RA}=\{0, 1, 2, 3\}$.

In another embodiment of the present disclosure, a maximum number of PRACH slots in the specific time duration may be 8.

In some implementations, a PRACH slot pattern may include only one slot. For example, the PRACH slot pattern may be mapped to the first position in the specific time duration, wherein the pattern parameter or $n_{slot}^{RA}$ includes $\{0\}$; the PRACH slot pattern may be mapped to the second position in the specific time duration, wherein the pattern parameter or $n_{slot}^{RA}$ includes $\{1\}$; the PRACH slot pattern may be mapped to the third position in the specific time duration, wherein the pattern parameter or $n_{slot}^{RA}$ includes $\{2\}$; the PRACH slot pattern may be mapped to the fourth position in the specific time duration, wherein the pattern parameter or $n_{slot}^{RA}$ includes $\{3\}$; the PRACH slot pattern may be mapped to the fifth position in the specific time duration, wherein the pattern parameter or $n_{slot}^{RA}$ includes $\{4\}$; the PRACH slot pattern may be mapped to the sixth position in the specific time duration, wherein the pattern parameter or $n_{slot}^{RA}$ includes $\{5\}$; the PRACH slot pattern may be mapped to the seventh position in the specific time duration, wherein the pattern parameter or $n_{slot}^{RA}$ includes {6}; and/or the PRACH slot pattern may be mapped to the eighth position in the specific time duration, wherein the pattern parameter or $n_{slot}^{RA}$ includes {7}.

In some implementations, a PRACH slot pattern may include two slots. For example, the PRACH slot pattern may be mapped to the first position and the second position in the specific time duration, wherein the pattern parameter or $n_{slot}^{RA}$ includes {0, 1}. Similarly for other examples, the pattern parameter of the PRACH slot pattern may include at least one of the following: {0, 2}, {0, 3}, {0, 4}, {0, 5}, {0, 6}, {0, 7}, {1, 2}, {1, 3}, {1, 4}, {1, 5}, {1, 6}, {1, 7}, {2, 3}, {2, 4}, {2, 5}, {2, 6}, {2, 7}, {3, 4}, {3, 5}, {3, 6}, {3, 7}, {4, 5}, {4, 6}, {4, 7}, {5, 6}, {5, 7}, or {6, 7}.

In some implementations, a PRACH slot pattern may include three slots. For example, the PRACH slot pattern may be mapped to the first, the second, and the third positions in the specific time duration, wherein the pattern parameter or $n_{slot}^{RA}$ includes {0, 1, 2}. Similarly for other examples, the pattern parameter of the PRACH slot pattern may include at least one of the following: {0, 1, 3}, {0, 1, 4}, {0, 1, 5}, {0, 1, 6}, {0, 1, 7}, {0, 2, 3}, {0, 2, 4}, {0, 2, 5}, {0, 2, 6}, {0, 2, 7}, {0, 3, 4}, {0, 3, 5}, {0, 3, 6}, {0, 3, 7}, {0, 4, 5}, {0, 4, 6}, {0, 4, 7}, {0, 5, 6}, {0, 5, 7}, {0, 6, 7}, {1, 2, 3}, {1, 2, 4}, {1, 2, 5}, {1, 2, 6}, {1, 2, 7}, {1, 3, 4}, {1, 3, 5}, {1, 3, 6}, {1, 3, 7}, {1, 4, 5}, {1, 4, 6}, {1, 4, 7}, {1, 5, 6}, {1, 5, 7}, {1, 6, 7}, {2, 3, 4}, {2, 3, 5}, {2, 3, 6}, {2, 3, 7}, {2, 4, 5}, {2, 4, 6}, {2, 4, 7}, {2, 5, 6}, {2, 5, 7}, {2, 6, 7}, {3, 4, 5}, {3, 4, 6}, {3, 4, 7}, {3, 5, 6}, {3, 5, 7}, {3, 6, 7}, {4, 5, 6}, {4, 5, 7}, {4, 6, 7}, or {5, 6, 7}.

In some implementations, a PRACH slot pattern may include four slots. For example, the PRACH slot pattern may be mapped to the first, the second, the third, and the fourth positions in the specific time duration, wherein the pattern parameter or $n_{slot}^{RA}$ includes {0, 1, 2, 3}. Similarly for other examples, the pattern parameter of the PRACH slot pattern may include at least one of the following: {0, 1, 2, 4}, {0, 1, 2, 5}, {0, 1, 2, 6}, {0, 1, 2, 7}, {0, 1, 3, 4}, {0, 1, 3, 5}, {0, 1, 3, 6}, {0, 1, 3, 7}, {0, 1, 4, 5}, {0, 1, 4, 6}, {0, 1, 4, 7}, {0, 1, 5, 6}, {0, 1, 5, 7}, {0, 1, 6, 7}, {0, 2, 3, 4}, {0, 2, 3, 5}, {0, 2, 3, 6}, {0, 2, 3, 7}, {0, 2, 4, 5}, {0, 2, 4, 6}, {0, 2, 4, 7}, {0, 2, 5, 6}, {0, 2, 5, 7}, {0, 2, 6, 7}, {0, 3, 4, 5}, {0, 3, 4, 6}, {0, 3, 4, 7}, {0, 3, 5, 6}, {0, 3, 5, 7}, {0, 3, 6, 7}, {0, 4, 5, 6}, {0, 4, 5, 7}, {0, 4, 6, 7}, {0, 5, 6, 7}, {1, 2, 3, 4}, {1, 2, 3, 5}, {1, 2, 3, 6}, {1, 2, 3, 7}, {1, 2, 4, 5}, {1, 2, 4, 6}, {1, 2, 4, 7}, {1, 2, 5, 6}, {1, 2, 5, 7}, {1, 2, 6, 7}, {1, 3, 4, 5}, {1, 3, 4, 6}, {1, 3, 4, 7}, {1, 3, 5, 6}, {1, 3, 5, 7}, {1, 3, 6, 7}, {1, 4, 5, 6}, {1, 4, 5, 7}, {1, 4, 6, 7}, {1, 5, 6, 7}, {2, 3, 4, 5}, {2, 3, 4, 6}, {2, 3, 4, 7}, {2, 3, 5, 6}, {2, 3, 5, 7}, {2, 3, 6, 7}, {2, 4, 5, 6}, {2, 4, 5, 7}, {2, 4, 6, 7}, {2, 5, 6, 7}, {3, 4, 5, 6}, {3, 4, 5, 7}, {3, 4, 6, 7}, {3, 5, 6, 7}, or {4, 5, 6, 7}.

In some implementations, a PRACH slot pattern may include five slots. For example, the PRACH slot pattern may be mapped to the first, the second, the third, the fourth, and the fifth positions in the specific time duration, wherein the pattern parameter or $n_{slot}^{RA}$ includes {0, 1, 2, 3, 4}. Similarly for other examples, the pattern parameter of the PRACH slot pattern may include at least one of the following: {0, 1, 2, 3, 5}, {0, 1, 2, 3, 6}, {0, 1, 2, 3, 7}, {0, 1, 2, 4, 5}, {0, 1, 2, 4, 6}, {0, 1, 2, 4, 7}, {0, 1, 2, 5, 6}, {0, 1, 2, 5, 7}, {0, 1, 2, 6, 7}, {0, 1, 3, 4, 5}, {0, 1, 3, 4, 6}, {0, 1, 3, 4, 7}, {0, 1, 3, 5, 6}, {0, 1, 3, 5, 7}, {0, 1, 3, 6, 7}, {0, 1, 4, 5, 6}, {0, 1, 4, 5, 7}, {0, 1, 4, 6, 7}, {0, 1, 5, 6, 7}, {0, 2, 3, 4, 5}, {0, 2, 3, 4, 6}, {0, 2, 3, 4, 7}, {0, 2, 3, 5, 6}, {0, 2, 3, 5, 7}, {0, 2, 4, 5, 6}, {0, 2, 4, 5, 7}, {0, 2, 4, 6, 7}, {0, 2, 5, 6, 7}, {0, 3, 4, 5, 6}, {0, 3, 4, 5, 7}, {0, 3, 4, 6, 7}, {0, 3, 5, 6, 7}, {0, 4, 5, 6, 7}, {1, 2, 3, 4, 5}, {1, 2, 3, 4, 6}, {1, 2, 3, 4, 7}, {1, 2, 3, 5, 6}, {1, 2, 3, 5, 7}, {1, 2, 3, 6, 7}, {1, 2, 4, 5, 6}, {1, 2, 4, 5, 7}, {1, 2, 4, 6, 7}, {1, 2, 5, 6, 7}, {1, 3, 4, 5, 6}, {1, 3, 4, 5, 7}, {1, 3, 4, 6, 7}, {1, 3, 5, 6, 7}, {1, 4, 5, 6, 7}, {2, 3, 4, 5, 6}, {2, 3, 4, 5, 7}, {2, 3, 4, 6, 7}, {2, 3, 5, 6, 7}, {2, 4, 5, 6, 7}, or {3, 4, 5, 6, 7}.

In some implementations, a PRACH slot pattern may include six slots. For example, the PRACH slot pattern may be mapped to the first, the second, the third, the fourth, the fifth, and the sixth positions in the specific time duration, wherein the pattern parameter or $n_{slot}^{RA}$ includes {0, 1, 2, 3, 4, 5}. Similarly for other examples, the pattern parameter of the PRACH slot pattern may include at least one of the following: {0, 1, 2, 3, 4, 6}, {0, 1, 2, 3, 4, 7}, {0, 1, 2, 3, 5, 6}, {0, 1, 2, 3, 5, 7}, {0, 1, 2, 3, 6, 7}, {0, 1, 2, 4, 5, 6}, {0, 1, 2, 4, 5, 7}, {0, 1, 2, 4, 6, 7}, {0, 1, 2, 5, 6, 7}, {0, 1, 3, 4, 5, 6}, {0, 1, 3, 4, 5, 7}, {0, 1, 3, 4, 6, 7}, {0, 1, 3, 5, 6, 7}, {0, 1, 4, 5, 6, 7}, {0, 2, 3, 4, 5, 6}, {0, 2, 3, 4, 5, 7}, {0, 2, 3, 4, 6, 7}, {0, 2, 3, 5, 6, 7}, {0, 2, 4, 5, 6, 7}, {0, 3, 4, 5, 6, 7}, {1, 2, 3, 4, 5, 6}, {1, 2, 3, 4, 5, 7}, {1, 2, 3, 4, 6, 7}, {1, 2, 3, 5, 6, 7}, {1, 2, 4, 5, 6, 7}, {1, 3, 4, 5, 6, 7}, or {2, 3, 4, 5, 6, 7}.

In some implementations, a PRACH slot pattern may include seven slots. For example, the PRACH slot pattern may be mapped to the first, the second, the third, the fourth, the fifth, the sixth, and the seventh positions in the specific time duration, wherein the pattern parameter or $n_{slot}^{RA}$ includes {0, 1, 2, 3, 4, 5, 6}. Similarly for other examples, the pattern parameter of the PRACH slot pattern may include at least one of the following: {0, 1, 2, 3, 4, 5, 7}, {0, 1, 2, 3, 4, 6, 7}, {0, 1, 2, 3, 5, 6, 7}, {0, 1, 2, 4, 5, 6, 7}, {0, 1, 3, 4, 5, 6, 7}, {0, 2, 3, 4, 5, 6, 7}, or {1, 2, 3, 4, 5, 6, 7}.

In some implementations, a PRACH slot pattern may include all eight slots. For example, the PRACH slot pattern may be mapped to the first, the second, the third, the fourth, the fifth, the sixth, the seventh, and the eighth positions in the specific time duration, wherein the pattern parameter or $n_{slot}^{RA}$ includes {0, 1, 2, 3, 4, 5, 6, 7}.

In another embodiment of the present disclosure, a maximum number of PRACH slots in the specific time duration may be 16.

In some implementations, a PRACH slot pattern may include only one slot. For example, the PRACH slot pattern may be mapped to the first position in the specific time duration, wherein the pattern parameter or $n_{slot}^{RA}$ includes {0}; the PRACH slot pattern may be mapped to the second position in the specific time duration, wherein the pattern parameter or $n_{slot}^{RA}$ includes {1}; the PRACH slot pattern may be mapped to the third position in the specific time duration, wherein the pattern parameter or $n_{slot}^{RA}$ includes {2}; the PRACH slot pattern may be mapped to the fourth position in the specific time duration, wherein the pattern parameter or $n_{slot}^{RA}$ includes {3}; the PRACH slot pattern may be mapped to the fifth position in the specific time duration, wherein the pattern parameter or $n_{slot}^{RA}$ includes {4}; the PRACH slot pattern may be mapped to the sixth position in the specific time duration, wherein the pattern parameter or $n_{slot}^{RA}$ includes {5}; the PRACH slot pattern may be mapped to the seventh position in the specific time duration, wherein the pattern parameter or $n_{slot}^{RA}$ includes {6}; the PRACH slot pattern may be mapped to the eighth position in the specific time duration, wherein the pattern parameter or $n_{slot}^{RA}$ includes {7}; the PRACH slot pattern may be mapped to the ninth position in the specific time duration, wherein the pattern parameter or $n_{slot}^{RA}$ includes {8}; the PRACH slot pattern may be mapped to the tenth position in the specific time duration, wherein the pattern parameter or $n_{slot}^{RA}$ includes {9}; the PRACH slot pattern may be mapped to the eleventh position in the specific time duration, wherein the pattern parameter or $n_{slot}^{RA}$ includes {10}; the PRACH slot pattern may be mapped to the twelfth position in the specific time duration, wherein the pattern parameter or $n_{slot}^{RA}$ includes {11}; the PRACH slot pattern may be mapped to the thirteen position in the specific time duration, wherein the pattern parameter or $n_{slot}^{RA}$ t includes {12}; the PRACH slot pattern may be mapped to the fourteenth position in the specific time duration, wherein the pattern parameter or $n_{slot}^{RA}$ includes {13}; the PRACH slot pattern may be mapped to the fifteenth position in the specific time duration, wherein the pattern parameter or $n_{slot}^{RA}$ includes {14}; and/or the PRACH slot pattern may be mapped to the sixteenth position in the specific time duration, wherein the pattern parameter or $n_{slot}^{RA}$ includes {15}.

In some implementations, a PRACH slot pattern may include two slots, and the pattern parameter comprises a set of {A, B}, wherein A and B are different integers selecting from 0 to 15, inclusive. There may be 120 different combinations for {A, B}, each of which corresponds to one example of the pattern parameter. For example but not limited to, when A=2 and B=4, the PRACH slot pattern may be mapped to the third position and the fifth position in the specific time duration, wherein the pattern parameter or $n_{slot}^{RA}$ includes {2, 4}.

In some implementations, a PRACH slot pattern may include three slots, and the pattern parameter comprises a set of {A, B, C}. Any one of the A, B, and C are different from any other value, and all of A, B, and C are integers selecting from 0 to 15, inclusive. There may be 560 different combinations for {A, B, C}, each of which corresponds to one example of the pattern parameter. For example but not limited to, when A=2, B=4, and C=5, the PRACH slot pattern may be mapped to the third, the fifth, and the sixth positions in the specific time duration, wherein the pattern parameter or $n_{slot}^{RA}$ includes {2, 4, 5}.

In some implementations, a PRACH slot pattern may include four slots, and the pattern parameter comprises a set of {A, B, C, D}. Any one of the A, B, C, and D are different from any other value, and all of A, B, C, and D are integers selecting from 0 to 15, inclusive. There may be 1820 different combinations for {A, B, C, D}, each of which corresponds to one example of the pattern parameter. For example but not limited to, when A=2, B=4, C=5, and D=6, the PRACH slot pattern may be mapped to the third, the fifth, the sixth, and the seventh positions in the specific time duration, wherein the pattern parameter or $n_{slot}^{RA}$ includes {2, 4, 5, 6}.

In some implementations, a PRACH slot pattern may include five slots, and the pattern parameter comprises a set of {A, B, C, D, E}. Any one of the A, B, C, D, and E is different from the any other value, and all of A, B, C, D, and E are integers selecting from 0 to 15, inclusive. There may be 4368 different combinations for {A, B, C, D, E}, each of which corresponds to one example of the pattern parameter. For example but not limited to, when A=2, B=4, C=5, D=6, and E=7, the PRACH slot pattern may be mapped to the third, the fifth, the sixth, the seventh, and the eighth positions in the specific time duration, wherein the pattern parameter or $n_{slot}^{RA}$ includes {2, 4, 5, 6, 7}.

In some implementations, a PRACH slot pattern may include six slots, and the pattern parameter comprises a set of {A, B, C, D, E, F}. Any one of the A, B, C, D, E, and F is different from the any other value, and all of A, B, C, D, E, and F are integers selecting from 0 to 15, inclusive. There may be 8008 different combinations for {A, B, C, D, E, F}, each of which corresponds to one example of the pattern parameter. For example but not limited to, when A=2, B=4, C=5, D=6, E=7, and F=8, the PRACH slot pattern may be mapped to the third, the fifth, the sixth, the seventh, the eighth, and the ninth positions in the specific time duration, wherein the pattern parameter or $n_{slot}^{RA}$ includes {2, 4, 5, 6, 7, 8}.

In some implementations, a PRACH slot pattern may include seven slots, and the pattern parameter comprises a set of {A, B, C, D, E, F, G}. Any one of the A, B, C, D, E, F, and G is different from the any other value, and all of A, B, C, D, E, F, and G are integers selecting from 0 to 15, inclusive. There may be 11440 different combinations for {A, B, C, D, E, F, G}, each of which corresponds to one example of the pattern parameter. For example but not limited to, when A=2, B=4, C=5, D=6, E=7, F=8, and G=9, the PRACH slot pattern may be mapped to the third, the fifth, the sixth, the seventh, the eighth, the ninth, and the tenth positions in the specific time duration, wherein the pattern parameter or $n_{slot}^{RA}$ includes {2, 4, 5, 6, 7, 8, 9}.

In some implementations, a PRACH slot pattern may include eight slots, and the pattern parameter comprises a set of {A, B, C, D, E, F, G, H}. Any one of the A, B, C, D, E, F, G, and H is different from the any other value, and all of A, B, C, D, E, F, G, and H are integers selecting from 0 to 15, inclusive. There may be 12870 different combinations for {A, B, C, D, E, F, G, H}, each of which corresponds to one example of the pattern parameter. For example but not limited to, when A=2, B=4, C=5, D=6, E=7, F=8, G=9, and H=10, the PRACH slot pattern may be mapped to the third, the fifth, the sixth, the seventh, the eighth, the ninth, the tenth, and the eleventh positions in the specific time duration, wherein the pattern parameter or $n_{slot}^{RA}$ includes {2, 4, 5, 6, 7, 8, 9, 10}.

In some implementations, a PRACH slot pattern may include nine slots, and the pattern parameter comprises a set of {A, B, C, D, E, F, G, H, I}. Any one of the A, B, C, D, E, F, G, H, and I is different from the any other value, and all of A, B, C, D, E, F, G, H, and I are integers selecting from 0 to 15, inclusive. There may be 11440 different combinations for {A, B, C, D, E, F, G, H, I}, each of which corresponds to one example of the pattern parameter. For example but not limited to, when A=2, B=4, C=5, D=6, E=7, F=8, G=9, H=10, and I=11, the PRACH slot pattern may be mapped to the third, the fifth, the sixth, the seventh, the eighth, the ninth, the tenth, the eleventh, and the twelfth positions in the specific time duration, wherein the pattern parameter or $n_{slot}^{RA}$ includes {2, 4, 5, 6, 7, 8, 9, 10, 11}.

In some implementations, a PRACH slot pattern may include ten slots, and the pattern parameter comprises a set of {A, B, C, D, E, F, G, H, I, J}. Any one of the A, B, C, D, E, F, G, H, I, and J is different from the any other value, and all of A, B, C, D, E, F, G, H, I, and J are integers selecting from 0 to 15, inclusive. There may be 8008 different combinations for {A, B, C, D, E, F, G, H, I, J}, each of which corresponds to one example of the pattern parameter. For example but not limited to, when A=0, B=1, C=2, D=3, E=4, F=5, G=6, H=7, I=8, and J=9, the PRACH slot pattern may be mapped to the first, the second, the third, the fourth, the fifth, the sixth, the seventh, the eighth, the ninth, and the tenth positions in the specific time duration, wherein the pattern parameter or $n_{slot}^{RA}$ includes {0, 1, 2, 3, 4, 5, 6, 7, 8, 9}.

In some implementations, a PRACH slot pattern may include eleven slots, and the pattern parameter comprises a set of {A, B, C, D, E, F, G, H, I, J, K}. Any one of the A, B, C, D, E, F, G, H, I, J, and K is different from the any other value, and all of A, B, C, D, E, F, G, H, I, J, and K are integers selecting from 0 to 15, inclusive. There may be 4368 different combinations for {A, B, C, D, E, F, G, H, I, J, K}, each of which corresponds to one example of the pattern parameter. For example but not limited to, when A=0, B=1, C=2, D=3, E=4, F=5, G=6, H=7, I=8, J=9, and K=10, the PRACH slot pattern may be mapped to the first, the second, the third, the fourth, the fifth, the sixth, the seventh, the eighth, the ninth, the tenth, and the eleventh positions in the specific time duration, wherein the pattern parameter or $n_{slot}^{RA}$ includes {0, 1, 2, 3, 4, 5, 6, 7, 8, 9, 10}.

In some implementations, a PRACH slot pattern may include twelve slots, and the pattern parameter comprises a set of {A, B, C, D, E, F, G, H, I, J, K, L}. Any one of the A, B, C, D, E, F, G, H, I, J, K, and L is different from the any other value, and all of A, B, C, D, E, F, G, H, I, J, K, and L are integers selecting from 0 to 15, inclusive. There may be 1820 different combinations for {A, B, C, D, E, F, G, H, I, J, K, L}, each of which corresponds to one example of the pattern parameter. For example but not limited to, when A=0, B=1, C=2, D=3, E=4, F=5, G=6, H=7, I=8, J=9, K=10, and L=11, the PRACH slot pattern may be mapped to the first, the second, the third, the fourth, the fifth, the sixth, the seventh, the eighth, the ninth, the tenth, the eleventh, and the twelfth positions in the specific time duration, wherein the pattern parameter or $n_{slot}^{RA}$ includes {0, 1, 2, 3, 4, 5, 6, 7, 8, 9, 10, 11}.

In some implementations, a PRACH slot pattern may include thirteen slots, and the pattern parameter comprises a set of {A, B, C, D, E, F, G, H, I, J, K, L, M}. Any one of the A, B, C, D, E, F, G, H, I, J, K, L, and M is different from the any other value, and all of A, B, C, D, E, F, G, H, I, J, K, L, and M are integers selecting from 0 to 15, inclusive. There may be 560 different combinations for {A, B, C, D, E, F, G, H, I, J, K, L, M}, each of which corresponds to one example of the pattern parameter. For example but not limited to, when A=0, B=1, C=2, D=3, E=4, F=5, G=6, H=7, I=8, J=9, K=10, L=11, and M=12, the PRACH slot pattern may be mapped to the first, the second, the third, the fourth, the fifth, the sixth, the seventh, the eighth, the ninth, the tenth, the eleventh, the twelfth, and the thirteenth positions in the specific time duration, wherein the pattern parameter or $n_{slot}^{RA}$ A includes {0, 1, 2, 3, 4, 5, 6, 7, 8, 9, 10, 11, 12}.

In some implementations, a PRACH slot pattern may include fourteen slots, and the pattern parameter comprises a set of {A, B, C, D, E, F, G, H, I, J, K, L, M, N}. Any one of the A, B, C, D, E, F, G, H, I, J, K, L, M, and N is different from the any other value, and all of A, B, C, D, E, F, G, H, I, J, K, L, M, and N are integers selecting from 0 to 15, inclusive. There may be 120 different combinations for {A, B, C, D, E, F, G, H, I, J, K, L, M, N}, each of which corresponds to one example of the pattern parameter. For example but not limited to, when A=0, B=1, C=2, D=3, E=4, F=5, G=6, H=7, I=8, J=9, K=10, L=11, M=12, and N=13, the PRACH slot pattern may be mapped to the first, the second, the third, the fourth, the fifth, the sixth, the seventh, the eighth, the ninth, the tenth, the eleventh, the twelfth, the thirteenth, and the fourteenth positions in the specific time duration, wherein the pattern parameter or $n_{slot}^{RA}$ includes {0, 1, 2, 3, 4, 5, 6, 7, 8, 9, 10, 11, 12, 13}.

In some implementations, a PRACH slot pattern may include fifteen slots, and the pattern parameter comprises a set of {A, B, C, D, E, F, G, H, I, J, K, L, M, N, O}. Any one of the A, B, C, D, E, F, G, H, I, J, K, L, M, N, and O is different from the any other value, and all of A, B, C, D, E, F, G, H, I, J, K, L, M, N, and O are integers selecting from 0 to 15, inclusive. There may be 16 different combinations for {A, B, C, D, E, F, G, H, I, J, K, L, M, N}, each of which corresponds to one example of the pattern parameter. The pattern parameter or $n_{slot}^{RA}$ may include at least one of the following:
{0, 1, 2, 3, 4, 5, 6, 7, 8, 9, 10, 11, 12, 13, 14},
{0, 1, 2, 3, 4, 5, 6, 7, 8, 9, 10, 11, 12, 13, 15},
{0, 1, 2, 3, 4, 5, 6, 7, 8, 9, 10, 11, 12, 14, 15},
{0, 1, 2, 3, 4, 5, 6, 7, 8, 9, 10, 11, 13, 14, 15},
{0, 1, 2, 3, 4, 5, 6, 7, 8, 9, 10, 12, 13, 14, 15},
{0, 1, 2, 3, 4, 5, 6, 7, 8, 9, 11, 12, 13, 14, 15},
{0, 1, 2, 3, 4, 5, 6, 7, 8, 10, 11, 12, 13, 14, 15},
{0, 1, 2, 3, 4, 5, 6, 7, 9, 10, 11, 12, 13, 14, 15},
{0, 1, 2, 3, 4, 5, 6, 8, 9, 10, 11, 12, 13, 14, 15},
{0, 1, 2, 3, 4, 5, 7, 8, 9, 10, 11, 12, 13, 14, 15},
{0, 1, 2, 3, 4, 6, 7, 8, 9, 10, 11, 12, 13, 14, 15},
{0, 1, 2, 3, 5, 6, 7, 8, 9, 10, 11, 12, 13, 14, 15},
{0, 1, 2, 4, 5, 6, 7, 8, 9, 10, 11, 12, 13, 14, 15},
{0, 1, 3, 4, 5, 6, 7, 8, 9, 10, 11, 12, 13, 14, 15},
{0, 2, 3, 4, 5, 6, 7, 8, 9, 10, 11, 12, 13, 14, 15}, or
{1, 2, 3, 4, 5, 6, 7, 8, 9, 10, 11, 12, 13, 14, 15}.

In some implementations, a PRACH slot pattern may include sixteen slots. The pattern parameter or $n_{slot}^{RA}$ may include {0, 1, 2, 3, 4, 5, 6, 7, 8, 9, 10, 11, 12, 13, 14, 15}.

The present disclosure describes methods, apparatus, and computer-readable medium for wireless communication. The present disclosure addressed the issues with configuring signal resource for a physical random access channel (PRACH). The methods, devices, and computer-readable medium described in the present disclosure may facilitate the performance of wireless transmission between a user equipment and a base station, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
   determining, by a user equipment (UE), signal resource for a physical random access channel (PRACH) by:
   determining, by the UE, a PRACH slot pattern with a pattern parameter based on a PRACH subcarrier spacing (SCS) and a specific time duration being a slot duration of a single slot for a SCS being 60 kHz, wherein:

the PRACH slot pattern comprises one PRACH slot and the pattern parameter comprises {7}, or the PRACH slot pattern comprises two PRACH slots and the pattern parameter comprises {3, 7}.

2. The method according to claim 1, wherein:

the PRACH SCS comprises 480 kHz.

3. A method for wireless communication, comprising:

determining, by a user equipment (UE), signal resource for a physical random access channel (PRACH) by:

determining, by the UE, a PRACH slot pattern with a pattern parameter based on a PRACH subcarrier spacing (SCS) and a specific time duration being a slot duration of a single slot for a SCS being 60 kHz, wherein:

the PRACH slot pattern comprises one PRACH slot and the pattern parameter comprises {15}, or the PRACH slot pattern comprises two PRACH slots and the pattern parameter comprises a set of {A, B}, wherein A and B are different integers selecting from 0 to 15, inclusive.

4. The method according to claim 3, wherein:

the PRACH SCS comprises 960 kHz.

5. An apparatus comprising:

a memory storing instructions; and at least one processor in communication with the memory, wherein, when the at least one processor collectively executes the instructions, the at least one processor is collectively configured to cause the apparatus to perform:

determining signal resource for a physical random access channel (PRACH) by:

determining a PRACH slot pattern with a pattern parameter based on a PRACH subcarrier spacing (SCS) and a specific time duration being a slot duration of a single slot for a SCS being 60 kHz, wherein:

the PRACH slot pattern comprises one PRACH slot and the pattern parameter comprises {7}, or the PRACH slot pattern comprises two PRACH slots and the pattern parameter comprises {3, 7}.

6. The apparatus according to claim 5, wherein:

the PRACH SCS comprises 480 kHz.

7. An apparatus comprising:

a memory storing instructions; and at least one processor in communication with the memory, wherein, when the at least one processor collectively executes the instructions, the at least one processor is collectively configured to cause the apparatus to perform:

determining signal resource for a physical random access channel (PRACH) by:

determining a PRACH slot pattern with a pattern parameter based on a PRACH subcarrier spacing (SCS) and a specific time duration being a slot duration of a single slot for a SCS being 60 kHz, wherein:

the PRACH slot pattern comprises one PRACH slot and the pattern parameter comprises {15}, or the PRACH slot pattern comprises two PRACH slots and the pattern parameter comprises a set of {A, B}, wherein A and B are different integers selecting from 0 to 15, inclusive.

8. The apparatus according to claim 7, wherein:

the PRACH SCS comprises 960 kHz.

9. An apparatus comprising:

a memory storing instructions; and at least one processor in communication with the memory, wherein, when the at least one processor collectively executes the instructions, the at least one processor is collectively configured to cause the apparatus to perform:

configuring signal resource for a physical random access channel (PRACH) by:

mapping a PRACH slot pattern with a pattern parameter based on a PRACH subcarrier spacing (SCS) and a specific time duration being a slot duration of a single slot for a SCS being 60 kHz, wherein:

the PRACH slot pattern comprises one PRACH slot and the pattern parameter comprises {7}, or the PRACH slot pattern comprises two PRACH slots and the pattern parameter comprises {3, 7}.

10. The apparatus according to claim 9, wherein:

the PRACH SCS comprises 480 kHz.

11. An apparatus comprising:

a memory storing instructions; and at least one processor in communication with the memory, wherein, when the at least one processor collectively executes the instructions, the at least one processor is collectively configured to cause the apparatus to perform:

configuring signal resource for a physical random access channel (PRACH) by:

mapping a PRACH slot pattern with a pattern parameter based on a PRACH subcarrier spacing (SCS) and a specific time duration being a slot duration of a single slot for a SCS being 60 kHz, wherein:

the PRACH slot pattern comprises one PRACH slot and the pattern parameter comprises {15}, or the PRACH slot pattern comprises two PRACH slots and the pattern parameter comprises a set of {A, B}, wherein A and B are different integers selecting from 0 to 15, inclusive.

12. The apparatus according to claim 11, wherein:

the PRACH SCS comprises 960 kHz.

* * * * *